(12) United States Patent
Ochs (10) Patent No.: US 12,083,892 B2
(45) Date of Patent: Sep. 10, 2024

(54) ARRANGEMENT OF A PALM REST AND AN OPERATING ELEMENT FOR A VEHICLE

(71) Applicant: MAN Truck & Bus SE, Munich (DE)

(72) Inventor: Thomas Ochs, Munich (DE)

(73) Assignee: MAN Truck & Buse SE, Munich (DE)

( * ) Notice: Subject to any disclaimer, the term of this patent is extended or adjusted under 35 U.S.C. 154(b) by 119 days.

(21) Appl. No.: 17/797,696

(22) PCT Filed: Jan. 20, 2021

(86) PCT No.: PCT/EP2021/051120
§ 371 (c)(1),
(2) Date: Aug. 4, 2022

(87) PCT Pub. No.: WO2021/156051
PCT Pub. Date: Aug. 12, 2021

(65) Prior Publication Data
US 2023/0083793 A1 Mar. 16, 2023

(30) Foreign Application Priority Data
Feb. 4, 2020 (DE) ...................... 10 2020 000 729.5

(51) Int. Cl.
*B60K 35/50* (2024.01)
*G05G 5/00* (2006.01)
(Continued)

(52) U.S. Cl.
CPC ............. *B60K 35/50* (2024.01); *G05G 5/005* (2013.01); *B60K 35/10* (2024.01); *B60K 35/28* (2024.01);
(Continued)

(58) Field of Classification Search
CPC ..... G01G 1/62; B60N 2/797; B60K 2360/682
See application file for complete search history.

(56) References Cited

U.S. PATENT DOCUMENTS 5,286,078 A * 2/1994 Mottino ................. B60N 2/797
  296/153
6,321,960 B1 * 11/2001 Ellis ..................... B60N 2/5891
  224/483
(Continued)

FOREIGN PATENT DOCUMENTS

CN    113799670 A  * 12/2021  ............. B60N 2/793
DE    19607398 C1    1/1998
(Continued)

OTHER PUBLICATIONS

German Search Report issued in German Patent Application No. 102020000729.5 dated Oct. 30, 2020. English translation not available.
(Continued)

*Primary Examiner* — Daniel D Yabut
(74) *Attorney, Agent, or Firm* — Weber Rosselli & Cannon LLP (57) ABSTRACT

The invention relates to an arrangement (I) of a palm rest (IO) and a manually actuatable operating element (20) for a vehicle. The palm rest (IO) is designed to adopt a first and a second position relative to the operating element (20), the palm rest (IO) being positioned, in the first position, such that it enables a hand (2) to be supported while the operating element (20) is being operated. To protect against damage and to enable the vehicle interior to be better used, the palm rest (IO) is positioned, in the second position, such that the palm rest (IO) at least partially projects over and/or covers the operating element (20).

18 Claims, 5 Drawing Sheets

(51) Int. Cl.
*B60K 35/10* (2024.01)
*B60K 35/28* (2024.01)

(52) U.S. Cl.
CPC .. *B60K 2360/126* (2024.01); *B60K 2360/143* (2024.01); *B60K 2360/164* (2024.01); *G05G 2505/00* (2013.01)

(56) References Cited

U.S. PATENT DOCUMENTS

| | | | |
|---|---|---|---|
| 7,497,298 B2 | 3/2009 | Shearer et al. | |
| 2011/0303802 A1* | 12/2011 | Nutaro | G05G 1/62 248/118 |
| 2013/0185662 A1* | 7/2013 | Quattrocolo | B60K 35/10 715/764 |
| 2015/0169195 A1 | 6/2015 | Choi | |
| 2016/0378320 A1* | 12/2016 | Suzuki | G06F 3/04847 345/158 |
| 2017/0001521 A1* | 1/2017 | Joo | B60K 35/00 |
| 2017/0024023 A1* | 1/2017 | Suzuki | B60R 11/0264 |
| 2017/0131792 A1* | 5/2017 | Hayashi | B60K 35/00 |
| 2018/0361898 A1* | 12/2018 | Davis | B64D 11/0627 |
| 2019/0275919 A1* | 9/2019 | Gayon | B64D 11/00155 |

FOREIGN PATENT DOCUMENTS

| | | | |
|---|---|---|---|
| DE | 102005033028 | 12/2006 | |
| DE | 102005033028 B3 * | 12/2006 | ............ B60K 35/00 |
| DE | 102007012326 A1 | 9/2008 | |
| DE | 102009008728 A1 * | 10/2009 | ............ B60K 37/06 |
| DE | 102009008727 A1 | 11/2009 | |
| DE | 102013222696 A1 | 5/2015 | |
| EP | 2397928 A1 | 12/2011 | |
| FR | 2816727 A1 | 5/2002 | |
| WO | WO-2005077701 A1 * | 8/2005 | ............ B60K 37/06 |
| WO | WO-2015136901 A1 * | 9/2015 | ............ B60K 37/06 |

OTHER PUBLICATIONS

International Search Report and Written Opinion issued in PCT/EP2021/051120 dated Apr. 14, 2021 with English translation.

* cited by examiner

ARRANGEMENT OF A PALM REST AND AN OPERATING ELEMENT FOR A VEHICLE

CROSS-REFERENCE TO RELATED APPLICATIONS

This application is a 371 application of PCT/EP2021/051120 filed Jan. 20, 2021 which claims benefit of and priority to German Patent Application Serial No. DE102020000729.5 filed Feb. 4, 2020, the disclosures of the above-identified applications are hereby incorporated by reference in their entirety.

The present disclosure relates to an arrangement of a palm rest and an operating element for a vehicle, wherein the palm rest enables a hand to be supported when the operating element is operated.

In practice, it is known that the operation of an operating element in a vehicle is often made more difficult since the movements of the vehicle during travel, in particular short-term movements, make precise input more difficult.

From practice, it is further known that in the utility vehicle sector, as a result of the relative movement which is always present during travel between the user, for example, the driver on an air-sprung suspension seat, and operating elements, there is a particularly great need to enable a targeted, precise operation of operating elements during travel.

From practice, it is therefore known to arrange on the operating element a palm rest which fixes the hand in the immediate vicinity of the operating element and which enables a sensitive and precise operation, for example, of a rotary push-button. The operating element, together with the palm rest, should therefore, in order to be able to permanently enable comfortable operation during travel without complaints, be fitted in an ergonomically correct position with respect to the operator; in this instance, with spacing from the driver which enables the operation without bending the upper body forwards and without lifting the shoulders from the rear face of the seat.

The Offenlegungsschrift DE 10 2013 222 696 A1 proposes the provision of a palm rest which can be arranged in two different positions with respect to a steering wheel rim in order to facilitate the operation of a touch-sensitive surface (touchpad) in spite of vehicle movements during travel. The palm rest can be positioned in a non-disruptive, space-saving position when not in use. However, the disadvantage is that the proposed solution is suitable primarily for operating elements inside a steering wheel rim and in particular for the autonomous driving mode and cannot be transferred to the improved operation of other operating elements in the vehicle.

An object of the present disclosure is therefore to provide an approach by means of which disadvantages of conventional techniques can be avoided and which enables precise operation of a manually actuated operating element.

These objects are achieved with an arrangement of a palm rest and a manually actuatable operating element having the features of the independent claim. Advantageous embodiments and applications of the present disclosure are set out in the dependent claims and are explained in greater detail in the following description with partial reference to the Figures.

According to a general aspect of the present disclosure, an arrangement of a palm rest and a manually actuatable operating element for a vehicle is provided. In this instance, the palm rest is constructed to assume at least a first position and a second position relative to the operating element. In the first position, the palm rest is positioned in such a manner known per se that it enables a hand to be supported when the operating element is operated. The first position consequently represents a position of use of the palm rest.

According to the present disclosure, the palm rest is positioned in the second position in such a manner that the palm rest at least partially overhangs and/or covers the operating element. This is intended to be understood to mean that at least a part-portion of the palm rest at least partially overhangs and/or covers the operating element.

This affords the particular advantage that the palm rest can be used in an advantageous dual function. On the one hand, the palm rest, when it is positioned in the first position, enables improved operation of an operating element by supporting a hand with which the operating element is operated. On the other hand, the palm rest, when it is not used, for example, when the vehicle is parked, can be moved into a position (referred to in this instance as the second position) in which the palm rest provides mechanical protection of the operating element by at least partially overhanging and/or covering the operating element. The second position consequently represents a position of non-use of the palm rest since the palm rest in this position is not used as a palm rest for operating the operating element.

This is particularly advantageous in the utility vehicle sector in utility vehicles having a driver's cab. When the vehicle is idle, a new situation of use occurs in most cases. The driver will stand up from his/her seat in order, for example, to stand in the region of the cab interior which allows this in the most comfortable manner. The space between the seats enables potential standing height, the sleeping berth is used, etcetera. When moving into this region, depending on the stature of the user, a degree of passage between the driver's seat and instrument panel is required in order for the legs not to become trapped or not to cause damage to operating components. If an operating element is, for example arranged in this passage region, this passage is necessarily reduced in terms of clear width by the operating element which has been fitted in the ergonomically correct position. There is a risk of injury and damage. The arrangement of the operating element and palm rest according to the present disclosure is consequently particularly advantageous for operating elements which are arranged in such a passage region.

A palm rest may have a support region which is suitable for being able to be used as a support or bearing surface for a palm of a person who intends to operate the operating element. To this end, the palm rest in order to form the support region may have a torsion-resistant shelf which is sized in such a manner that it has at least such a size and shape that a typical palm can be supported thereon.

In a preferred embodiment of the arrangement, the palm rest has an elongate and/or arm-like retention region which is constructed for movably arranging the palm rest relative to the operating element. According to this embodiment, the palm rest further has an upper region which is formed on an end region of the retention region, protrudes therefrom, preferably protrudes in the direction of the operating element, and forms at the upper side thereof a palm rest surface. The embodiment enables a compact, space-saving implementation of the palm rest. A particular advantage is further that the palm rest in the second position releases a previously required space in the direction towards an operator so that this space can be used for other purposes when the operating element is not in use, for example, in order to increase a passage region. Furthermore, the risk of damage to both the palm rest and the operating element is reduced. The retention region and the upper region may form an integral component.

In this instance, the upper region may in the second position form a cover or a partial cover for an upper side of the operating element.

The upper region may, for example, be in the form of a handle, knob, mushroom and/or a thickened portion at an end region of the retention region. Furthermore, the upper region may protrude in a substantially perpendicular manner from the retention region, preferably only in one direction perpendicularly from the retention region. These variants are advantageous since these forms are both advantageous for producing a palm rest surface on the upper region and for producing an at least partial overhang and/or coverage of the operating element by the upper region in the second position of the palm rest.

According to another embodiment, there is provision for the upper region in the second position to overhang the operating element in such a manner that, when a hand is supported on the palm rest, a manually actuated operation of the operating element is not possible or is at least impeded or is possible only with considerable loss of comfort. In other words, an operation of the operating element is prevented or at least made more difficult when the palm rest is moved into the second position, but instead the palm rest in this position can form a mechanical protection of the operating element.

In another embodiment, the palm rest has a pivot connection in order to movably arrange the palm rest relative to the operating element and to configure it to be able to be pivoted and/or folded relative to the operating element. The pivot connection consequently enables the second position to be assumed starting from the first position towards the operating element and vice versa. The embodiment enables a particularly compact, space-saving production of the palm rest. A particular advantage is further that the palm rest in the second position releases a space which was previously required as a result of the positioning in the first position (position for use) in the direction towards an operator again by pivoting into the second position so that this space can be used for other purposes when the operating element is not in use, for example, in order to increase a passage region, as described above.

For example, in order to form the pivot connection, the palm rest can be arranged so as to be able to be pivoted with respect to and/or on the operating element about a pivot axis which extends transversely relative to the longitudinal direction of the retention region and which is arranged at an end region of the retention region facing away from the upper region. The palm rest may to this end be pivotably retained on a housing or a retention member of the operating element. In a state installed in the vehicle, the arrangement may be assembled in such a manner that the pivot axis is a horizontal axis which enables the palm rest to be "folded up" or pivoted upwards in order to move the palm rest from the first position into the second position. The pivot connection may directly connect the palm rest to the operating element or a housing or a retention member of the operating element in a pivotable manner. Alternatively, the pivot connection may be formed between the palm rest and another vehicle component on which the operating component is retained or which is arranged adjacent to the operating component.

However, it should be emphasised that other embodiments are also possible in order to arrange the palm rest so as to be able to be moved relative to the operating element, for example, a guiding mechanism by means of which the palm rest can be moved from the first position into the second position, preferably moved in a linear manner.

The operating element is not limited to a specific embodiment. Only possible and particularly advantageous embodiments of the operating element are described below.

In another embodiment, the operating element may comprise a mechanical rotary switch. Alternatively or additionally, the operating element may comprise a touch-sensitive input surface (so-called touchpad). Alternatively or additionally, the rotary switch may be in the form of a rotary push switch, that is to say, the rotary switch may be operated by means of rotational operation and pressure activation.

According to another preferred variant, the mechanical rotary switch may have a rotatable outer ring which surrounds the touch-sensitive input surface (so-called touchpad). According to another preferred variant, the outer ring may alternatively or additionally form a mechanical pressure or toggle switch which is preferably in the form of a monostable push, pressure or toggle switch which, after manual deflection in at least one direction, returns to its original position again. This means that the monostable push, pressure or toggle switch consequently always independently returns to its original position after the external actuation force is removed. In other words, the monostable push, pressure or toggle switch has substantially only one stable push, pressure or toggle position and, after being switched in a forward, backward or laterally directed direction always returns into this monostable position again.

Preferably, the operating element combines both the rotary switch, the touch-sensitive input surface and the mechanical pressure or toggle switch in a multifunctional operating element. Such operating elements are particularly advantageous in the vehicle for operating an infotainment system of the vehicle. Accordingly, the operating element may be an operating element for an infotainment system of the vehicle.

In another embodiment, the arrangement may have an overload protection for protecting the palm rest and/or the operating element from excessively powerful mechanical loading. For example, the overload protection may optionally be in the form of a hinge (protection hinge) or joint (protection joint) which, at a predetermined mechanical overload which an operator applies to the arrangement, becomes disengaged or unclipped. For example, the pivot connection of the palm rest may be in the form of a protection hinge or protection joint which has a resilient device or resilient mechanism for protection from mechanical overloading, wherein the resilient device or the resilient mechanism presses the palm rest against a stop edge when the palm rest is in the first and/or second position. The resilient device may in this instance be configured in such a manner that, when the load on the palm rest exceeds a normal range, for example, exceeds a predetermined threshold value, the stop edge can be redirected, for example, by the palm rest assuming a third position in order to discharge overload forces.

According to another aspect, the present disclosure further relates to a vehicle having an arrangement comprising the palm rest and the operating element, as described in this document. The vehicle may be a motor vehicle, preferably a utility vehicle, such as, for example, a lorry or a bus.

In one embodiment, the operating element is an operating element for controlling a vehicle infotainment system. In this instance, the operating element may be an operating element by means of which only one infotainment system of the vehicle can be controlled.

In another embodiment, the operating element and the palm rest may be arranged in the region of or adjacent to an interior component of the vehicle in such a manner that the palm rest is located in the second position closer to the interior component than in the first position. The interior component may be an instrument panel. In this variant, the palm rest in the second position is consequently closer to the instrument panel and in this position releases space which was previously required for other uses.

According to a particularly preferred embodiment, the arrangement comprising the operating element and the palm rest is arranged between an instrument panel and a driver's seat of the vehicle, wherein a free space between the arrangement and the driver's seat is greater when the palm rest is in the second position than when the palm rest is in the first position.

According to an advantageous development of this embodiment, the vehicle is a motor vehicle, preferably a utility vehicle, for example, a lorry, comprising a driver's cab in which there is arranged behind a driver's seat a recreation area for the driver which can be reached via a passage to the recreation area which adjoins the driver's seat. Such recreation areas of driver's cabs are known per se from the prior art. According to the advantageous development, the arrangement comprising the operating element and the palm rest is arranged between an instrument panel and a driver's seat of the vehicle in the passage region in such a manner that the palm rest is located in the second position closer to the instrument panel than in the first position. Furthermore, a width of the passage region is greater when the palm rest is in the second position.

As already set out above, this variant is particularly advantageous in order, when the vehicle is stopped, to prevent unintentional damage to the operating element and/or the palm rest if, for example, when the vehicle is stopped the driver stands up from his/her seat in order to move in the region of the cab interior through the passage region. To this end, in the idle state, the palm rest is intended to be moved into the second position.

The above-described preferred embodiments and features of the present disclosure can be freely combined with each other. Other details and advantages of the present disclosure are described below with reference to the appended drawings, in which:

Elements which are identical or equivalent are referred to in all the Figures with the same reference numerals and are sometimes not described separately.

Figure 1A:
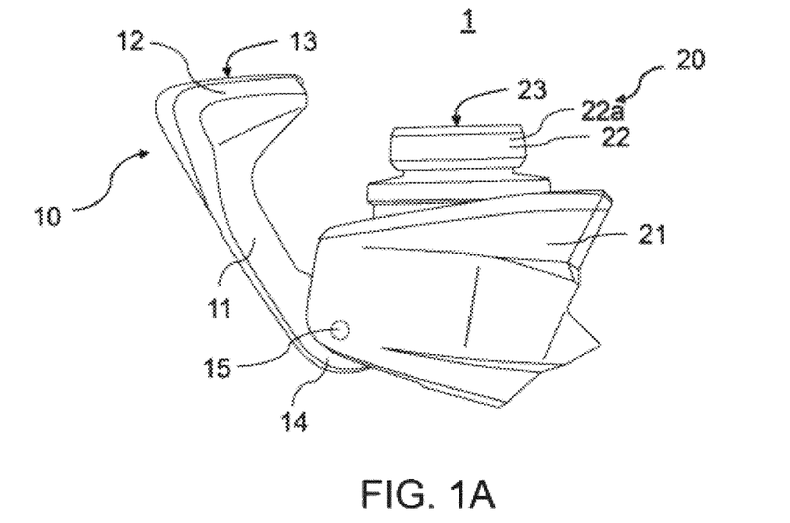
FIG. 1A shows a side view of an arrangement comprising the palm rest and operating element in the first position according to an embodiment of the present disclosure.

FIG. 1A shows a schematic side view of an arrangement 1 comprising a palm rest 10 and an operating element 20 according to an embodiment of the present disclosure. The operating element 20 is a manually actuatable operating element for an infotainment system of a motor vehicle. An infotainment system in the context of the present disclosure is in particular an information, entertainment and communication system or an information and entertainment system of the motor vehicle. Via the operating element 10, the infotainment system can be operated, for example, in order to operate the navigation system, the entertainment system and/or in order to select and call up the vehicle information items.

The operating element 20 comprises in this instance according to the embodiment shown by way of example a mechanical rotary switch 22 which has for operator input a rotatable outer ring 22a and a touch-sensitive input surface 23 which is located on the upper side of the operating element 20 and which is surrounded by the rotatable outer ring 22a. The touch-sensitive input surface 23 forms a so-called touchpad so that an operator can enter input commands using their fingers via the input surface 23. The outer ring 22a further forms a mechanical pressure switch which is in the form of a monostable toggle switch which can be deflected in four horizontal directions and which after the manual deflection returns to its original position again. The operating element can consequently be operated not only by rotating the outer ring 22a and via the touch-sensitive input surface 23, but in addition also via a horizontal deflection of the outer ring 22a.

The operating element 20 is retained in a retention member 21 which, for example, can be arranged on an instrument panel or on a region of a central console.

The arrangement further comprises a palm rest 10. The palm rest 10 serves to facilitate the operation of the operating element 10 which without a palm rest 10 would be made more difficult as a result of the fact that the movements of the vehicle during travel, in particular short-term movements, make precise input more difficult. In the utility vehicle sector, this is even more significant since the driver generally sits on an air-sprung suspension seat and thereby constantly carries out slightly resilient movements during travel which leads to constant relative movements between the driver and an operating element which is fixedly arranged in the vehicle.

By placing a palm 3 on the palm rest, a selective, precise operation of the operating element 20 is facilitated since the hand 2 is fixed to the palm rest 10 so that a sensitive and precise operation, for example, of the rotary pressure switch 21 or touchpad 23 is enabled.

Figure 2A:
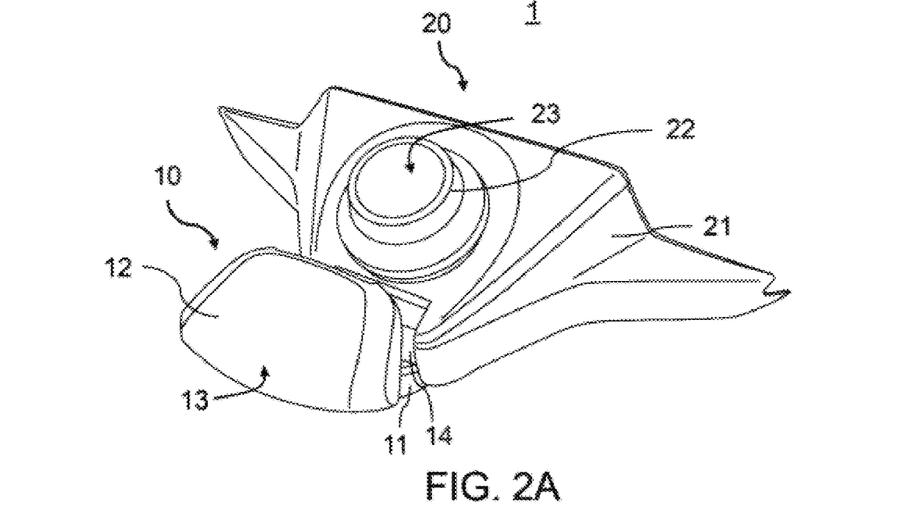
FIG. 2A shows a perspective view of an arrangement comprising the palm rest and operating element in the first position according to an embodiment of the present disclosure.
Figures 3A, 3B:
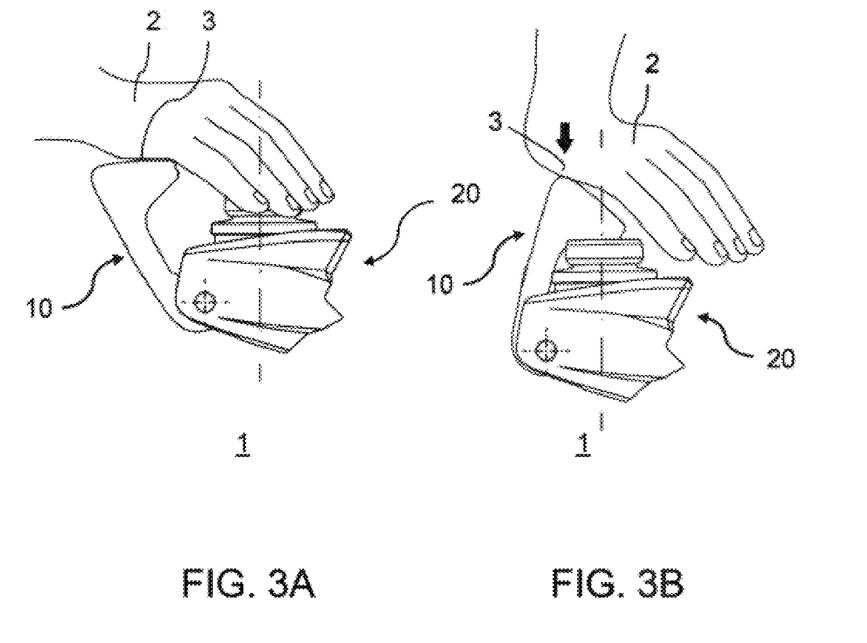
FIG. 3A shows a side view of an arrangement comprising the palm rest and operating element in the first position with a hand placed thereon according to an embodiment of the present disclosure.
FIG. 3B shows a side view of an arrangement comprising the palm rest and operating element in the second position with a hand placed thereon according to an embodiment of the present disclosure.

The palm rest 10 is arranged so as to be able to be pivoted relative to the operating element 20 via a pivot connection 15 and can be moved by means of pivoting into a first and a second position relative to the operating element 20. In the first position, the palm rest 10 is positioned in such a manner that it enables a hand 2 to be supported during the operation of the operating element 20. This first position is illustrated in FIGS. 1A, 2A and 3A.

Figure 1B:
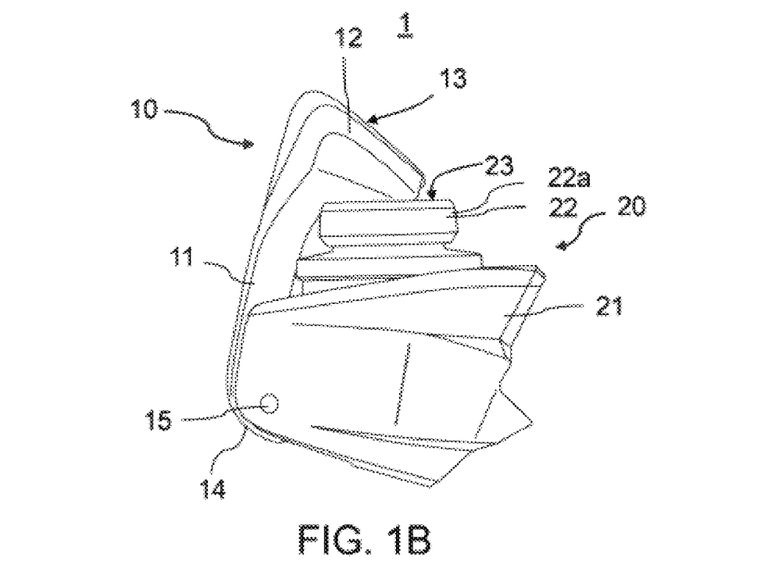
FIG. 1B shows a side view of an arrangement comprising the palm rest and operating element in the second position according to an embodiment of the present disclosure.
Figure 2B:
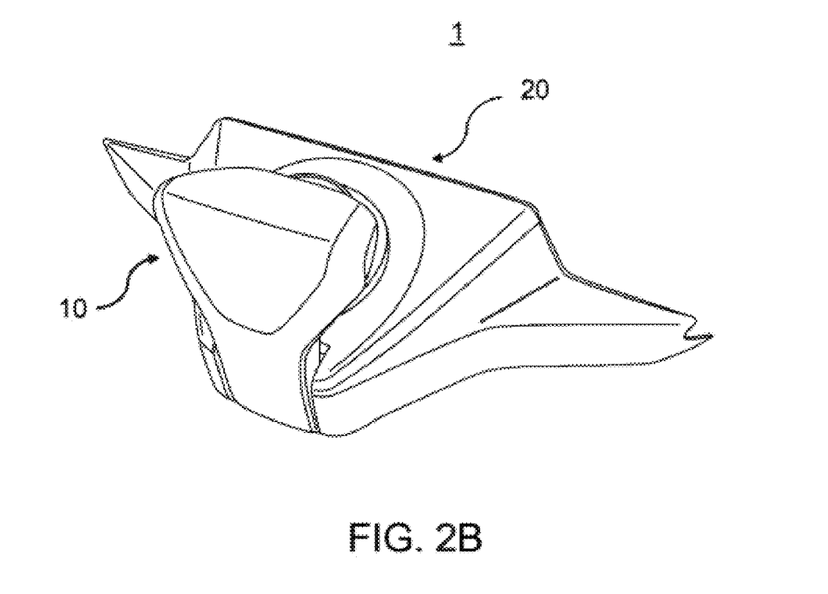
FIG. 2B shows a perspective view of an arrangement comprising the palm rest and operating element in the second position according to an embodiment of the present disclosure.

In the second position, the palm rest 10 is positioned in such a manner that the palm rest 10 at least partially overhangs and/or covers the operating element 20. This first position is illustrated in FIGS. 1B, 2B and 3B.

The palm rest 10 has to this end an elongate and arm-like retention region 11 which is constructed to movably arrange the palm rest 10 relative to the operating element 20.

The pivot connection 15 is formed by means of a pivot axis 15 which extends transversely relative to the longitudinal direction of the retention region and which is arranged at a lower end region 14 of the retention region 11 or the pivot arm 11 in order to arrange the palm rest so as to be able to be pivoted on the operating element 20, in this instance the retention member 21 of the operating element 20.

The palm rest 10 further comprises an upper region 12 which is formed on an end region of the retention region 11 and which protrudes therefrom in the direction of the operating element 20. The upper region 12 forms at the upper side thereof a palm rest surface 13 for receiving the palm rest 3. The palm rest surface 13 must be sufficiently large to be able to be used as a support or resting surface for a palm 3 of a grown person (cf. FIG. 3A).

The support face 12 is further configured in a planar or slightly curved manner. As can be seen in FIG. 1A, the upper region 12 is formed thereon as a thickened portion on an end region of the retention region 11. The upper region may be in the form of a handle, knob or mushroom.

In the idle state of the vehicle, by manually pivoting the palm rest 10, it can be moved into the second position, as illustrated, for example, in FIG. 1B. As already mentioned, the palm rest 19 is positioned in the second position in such a manner that the palm rest at least partially overhangs and/or covers the operating element 20. In this instance, the upper region 12 of the palm rest at least partially overhangs the operating element 20 in such a manner that, when a hand 2 is supported on the palm rest 10, a manually actuated operation of the operating element 20 is not possible or is at least impeded or is only possible with considerable losses of comfort. This is illustrated in FIG. 3B.

However, the second position affords the advantage that, as a result of the palm rest 10, on the one hand, previously required space in the vehicle is released and at the same time a mechanical protection for the operating element 20 is enabled by the palm rest, in particular for the sensitive upper side (touch pad, rotary switch, etcetera) of the operating element in order to better protect it from unintentional damage.

Figures 4A, 4B:
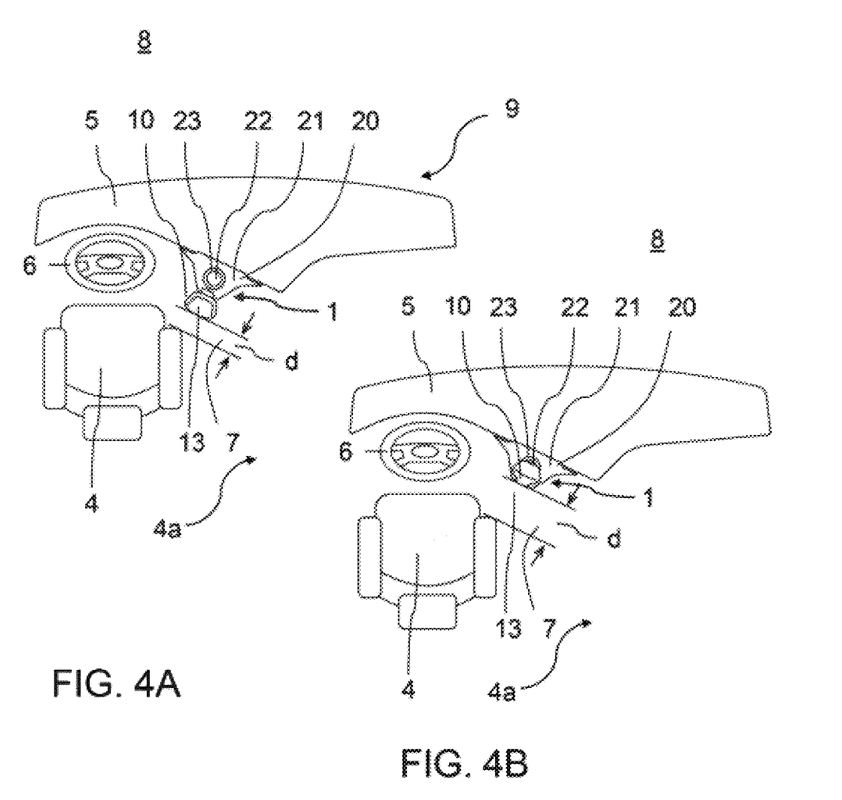
FIG. 4A shows a plan view of an interior of a vehicle having an arrangement comprising the palm rest and operating element in the first position according to an embodiment of the present disclosure.
FIG. 4B shows a plan view of an interior of a vehicle having an arrangement comprising the palm rest and operating element in the second position according to an embodiment of the present disclosure.

This is illustrated again in FIGS. 4A and 4B with reference to another embodiment. FIGS. 4A and 4B show as an example of a vehicle 8 a utility vehicle, in particular a lorry, wherein of this only a schematic plan view of an interior of a driver's cab or a driver's compartment 9 is shown. The other portions of the vehicle can be configured in a manner known per se and are not illustrated.

The arrangement 1 comprising the palm rest 10 and the manually actuatable operating element 20 for operating an infotainment system of the vehicle can be seen again, wherein the palm rest 10 is again constructed to be able to assume a first and a second position relative to the operating element 20, as described above.

The arrangement 1 comprising the operating element 20 and palm rest 10 is, in order to be able to permanently enable comfortable operation without any complaints during travel, fitted in an ergonomically suitable position relative to the operator; in this instance, with spacing from the driver which enables operation without bending the upper body forwards and without lifting the shoulders from the seat back face. To this end, the arrangement 1 is arranged within arm's reach of the driver's seat 4 in a central region of the instrument panel 5. The instrument panel 5 is intended to be understood to be the entire region which extends along the front windscreen and which comprises the cluster of instruments of the vehicle, the screen(s) of the infotainment system and the region which adjoins the windscreen at the passenger side.

Behind the driver's seat 4 in the driver's cab 9 there is a recreation area 4a for the driver, for example, with a sleeping berth. The recreation area 4a can be reached via a passage 7 from the driver's seat 4. As can be seen in FIG. 4A, the arrangement 1 is arranged adjacent to or in an edge region of this passage 7 in the region of the instrument panel 5.

In this instance, the arrangement 1 comprising the operating element 20 and the palm rest 10 is arranged in such a manner between the instrument panel 5 and the driver's seat 4 in the passage region 7 that the palm rest 10 in the second position is located closer to the instrument panel 5 than in the first position. In order to assume the second position, the palm rest is folded upwards towards the operating element 20 in the direction of the instrument panel 5. In the second position, a width d of the passage region 7 thereby increases when the palm rest 10 is located in the second position in comparison with a situation when the palm rest 10 is located in the first position.

In summary, the passage width d between the driver's seat 4 and the instrument panel 5 is consequently increased in order to facilitate passage into the recreation area 4a of the cab for the driver and to reduce the risk of becoming trapped. The sensitive operating element 20 which is provided with sensors and movable components is at the same time surrounded by the palm rest 10 or at least partially covered and thus protected from mechanical damage. In this instance, not only is the protection when brushing past significant, but in particular the stable coverage from above, for the not unlikely event that the driver when standing up from the seat may support him/herself on the console of the operating element.

Figure 5:
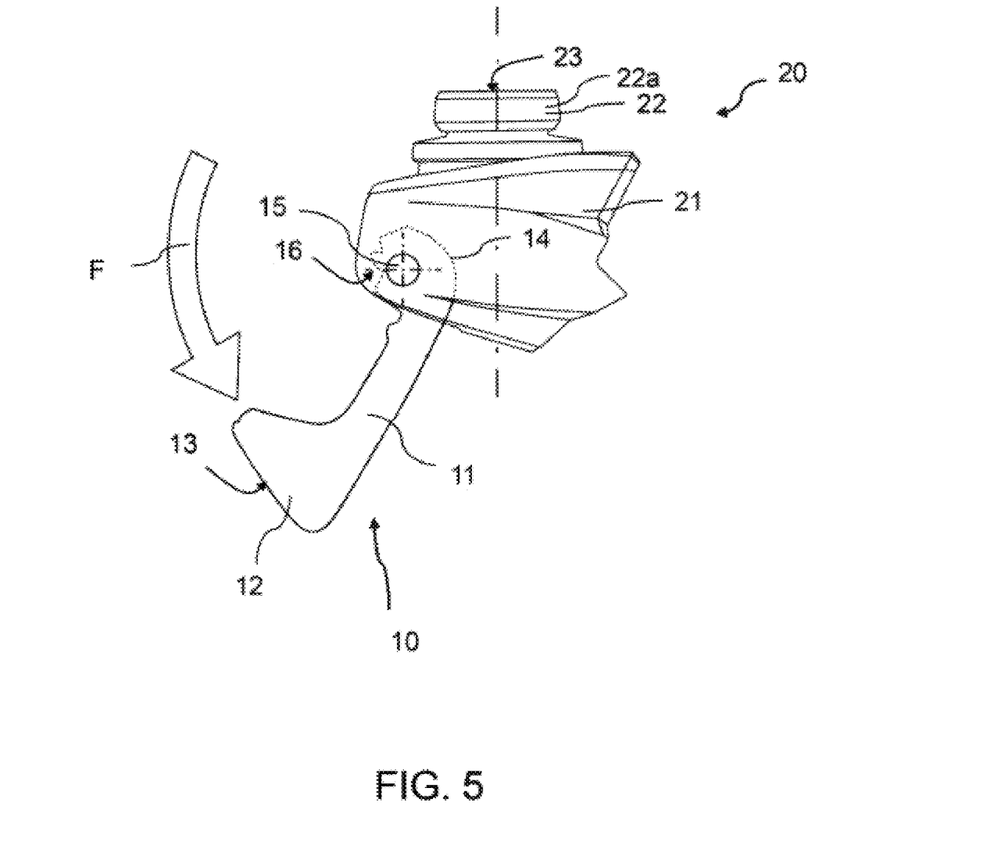
FIG. 5 shows a side view of an arrangement comprising the palm rest and operating element in a third position to illustrate the function of an overload protection according to another embodiment of the present disclosure.

FIG. 5 shows a side view of an arrangement comprising the palm rest and operating element in a third position to illustrate the function of an overload protection according to another embodiment of the present disclosure. According to this additional embodiment, the arrangement comprising the palm rest 10 and operating element 20 has an overload protection 16 for protecting the palm rest and/or the operating element from excessively powerful mechanical loading.

When the palm rest 10 is pivoted into its position for use, that is to say, the palm rest 10 is located in the first position according to FIG. 1A, the end position of the rotational movement is defined in this instance by a stop edge (not illustrated) below the rotation axis 15, on which the component 11, in particular the end region 14 of the pivot arm 11, rests and is supported thereon. By means of a powerful resilient mechanism (not shown), this stop edge can be redirected when the load leaves the region which is conventional during use and becomes so high that portions of the sub-assembly would otherwise break. In other words, the resilient mechanism is configured in such a manner that the component can pivot in a downward direction away from the stop edge when the force acting from above, schematically illustrated in FIG. 5 by the arrow F, exceeds a predetermined threshold value. In this instance, the palm rest 10 carries out the rotational movement shown in FIG. 5 in a downward direction around the retention member 21 and the operating element 20 in order to discharge the force F in a downward direction. The palm rest 10 can in the event of an excessively high load consequently pivot away downwards into a third redirection position, as illustrated in FIG. 5.

In order to produce this overload protection 16, it may consequently have the above-described stop edge and the resilient mechanism in the region of the pivot axis 15 in order in this manner to form a protection joint or protection hinge.

Although the present disclosure has been described with reference to specific embodiments, it is possible for a person skilled in the art to see that various modifications can be carried out and equivalents can be used as a replacement without departing from the scope of the present disclosure. Consequently, the present disclosure is not intended to be limited to the embodiments disclosed, but instead should comprise all the embodiments which are included within the scope of the appended patent claims. In particular, the present disclosure also claims protection for the subject-matter and the features of the dependent claims regardless of the claims to which reference is made.

LIST OF REFERENCE NUMERALS

1 Arrangement
2 Hand
3 Palm
4 Driver's seat
4a Recreation area
5 Instrument panel
6 Steering wheel
7 Free space, for example, passage
8 Vehicle
9 Driver's cab
10 Palm rest
11 Retention region
12 Upper region
13 Palm rest surface
14 End region
15 Pivot connection
16 Overload protection
20 Operating element
21 Retention member
22 Rotary switch
22a Outer ring
23 Touch-sensitive surface

The invention claimed is:

1. A vehicle comprising an arrangement of a palm rest and a manually actuatable operating element for the vehicle, wherein the palm rest is constructed to assume a first position and a second position relative to the operating element, wherein the palm rest in the first position is positioned in such a manner that it enables a hand to be supported when the operating element is operated,
characterised in that
the palm rest is positioned in the second position in such a manner that the palm rest at least partially overhangs and/or covers the operating element
wherein the vehicle is a utility vehicle, and
wherein the vehicle comprises a driver's cab in which there is arranged behind a driver's seat a recreation area for the driver which can be reached via a passage to the recreation area which adjoins the driver's seat, wherein the arrangement comprising the operating element and the palm rest is arranged between an instrument panel and a driver's seat of the vehicle in the passage region in such a manner that the palm rest is located in the second position closer to the instrument panel than in the first position and a width of the passage region is greater when the palm rest is in the second position than when the palm rest is in the first position.

2. The vehicle according to claim 1, wherein the palm rest has:
 a) an elongate retention region which is constructed for movably arranging the palm rest relative to the operating element, and
 b) an upper region which is formed on an end region of the retention region, protrudes therefrom, and forms at the upper side thereof a palm rest surface.

3. The vehicle according to claim 2, wherein the upper region
 a) is in the form of a handle, knob, mushroom and/or a thickened portion at an end region of the retention region; and/or
 b) protrudes in a substantially perpendicular manner from the retention region.

4. The vehicle according to claim 2, wherein in the second position the upper region overhangs the operating element in such a manner that, when a hand is supported on the palm rest, a manually actuated operation of the operating element is at least impeded.

5. The vehicle according to claim 2, wherein, in order to form the pivot connection—the palm rest is retained so as to be able to be pivoted on the operating element about a pivot axis which extends transversely to the longitudinal direction of the retention region and which is arranged at an end region of the retention region facing away from the upper region.

6. The vehicle according to claim 2, wherein:
the upper region protrudes in the direction of the operating element: or
the palm rest is retained on a housing or a retention member of the operating element.

7. The vehicle according to claim 1, wherein the palm rest has a pivot connection in order to movably arrange the palm rest relative to the operating element.

8. The vehicle according to claim 1, wherein the operating element comprises a mechanical rotary switch and a touch-sensitive input surface.

9. The vehicle according to claim 8, wherein the mechanical rotary switch has a rotatable outer ring which surrounds the touch-sensitive input surface.

10. The vehicle according to claim 9, wherein the outer ring further forms a mechanical push, pressure or toggle switch.

11. The vehicle according to claim 9, wherein the mechanical push, pressure or toggle switch is in the form of a monostable push or toggle switch which, after manual deflection in at least one direction, returns to its original position again.

12. The vehicle according to claim 1, wherein the arrangement has an overload protection for protecting the palm rest and/or the operating element from excessively powerful mechanical loading.

13. The vehicle of claim 12, wherein the overload protection is in the form of a protection hinge or a protection joint, which becomes disengaged or unclipped at a predetermined mechanical overload.

14. The vehicle according to claim 1,
a) wherein the operating element is an operating element for controlling a vehicle infotainment system; and/or
b) wherein only one infotainment system of the vehicle can be controlled by means of the operating element.

15. The vehicle according to claim 1, wherein the operating element and the palm rest are arranged in the region of or adjacent to an interior component of the vehicle in such a manner that the palm rest is located in the second position closer to the interior component than in the first position.

16. The vehicle according to claim 15, wherein the interior component is an instrument panel.

17. The vehicle according to claim 1, wherein the arrangement comprising the operating element and the palm rest is arranged between an instrument panel and a driver's seat of the vehicle, wherein a free space between the arrangement and the driver's seat is greater when the palm rest is in the second position than when the palm rest is in the first position.

18. The vehicle according to claim 1, wherein the utility vehicle is a lorry or a bus.

\* \* \* \* \*